Aug. 12, 1969    R. F. DEHN    3,461,250
ELECTRICAL CONDUCTOR BARS
Filed May 29, 1968    3 Sheets-Sheet 3

INVENTOR.
ROY F. DEHN
BY
Watts, Hoffmann, Fisher & Heinke
ATTORNEYS.

United States Patent Office

3,461,250
Patented Aug. 12, 1969

3,461,250
ELECTRICAL CONDUCTOR BARS
Roy F. Dehn, Wickliffe, Ohio, assignor to McNeil Corporation, Akron, Ohio, a corporation of Ohio
Continuation-in-part of application Ser. No. 610,580, Jan. 30, 1967, which is a division of application Ser. No. 494,187, Oct. 8, 1965, which in turn is a continuation-in-part of application Ser. No. 313,959, Oct. 4, 1963. This application May 29, 1968, Ser. No. 733,054
Int. Cl. B60m 1/34
U.S. Cl. 191—22    8 Claims

ABSTRACT OF THE DISCLOSURE

Electrical conductor bars each comprised of a longitudinal high-strength T-shaped ferrous metal part and a coextensive, high conductivity flanged non-ferrous metal part, constructed with the centers of gravity of the ferrous metal and non-ferrous metal parts close together to reduce thermal distortion.

---

This application is a continuation-in-part of application Ser. No. 610,580, filed Jan. 30, 1967, which is a division of application Ser. No. 494,187, filed Oct. 8, 1965, now Patent No. 3,325,606, which is in turn a continuation-in-part of application Ser. No. 313,959, filed Oct. 4, 1963, now Patent No. 3,222,464.

This invention relates to electrical conductor bars for power distributing systems and more particularly to bimetallic electrical conductor bars that are strong, wear-resistant, light in weight and highly conductive, and constructed to reduce distortion caused by differential thermal expansion of the bimetallic components. Such conductor bars find use in transit systems and the like for supplying current to electrically powered vehicles having current collectors that ride on conductor bars.

A composite electrical conductor bar having advantageous high strength and good conductive characteristics is disclosed in the aforementioned applications and patent, the disclosures of which are hereby incorporated herein by reference. The disclosed bar is formed of an I-shaped aluminum member and a T-shaped steel member. The T-shaped steel member provides strength that permits the conductor to span substantial distances between supports and also provides an electrically conductive surface having good wearing qualities to contact a sliding collector shoe, such as the collector shoe of a transit car. The I-shaped aluminum member provides support or anchoring structure for the T-shaped member and imparts high electrical conductivity to the conductor bar while keeping the total weight of the conductor bar relatively low.

One problem encountered with composite conductor bars is distortion caused by differential thermal expansion of the bar-forming members when subjected to a temperature change. This is especially troublesome where the conductors terminate in a cantilevered portion that may extend ten feet or more from a support, as at a switch along a guide track for a transit car. In such areas the conductor bar is discontinuous and the moving collector shoe sliding along the wear surface of the bar must leave one bar section and thereafter contact a cantilevered portion of a subsequent section. Deflection of the bar in this area can locate cantilevered end in the direct path of the collector shoe, causing serious damage to equipment and disruption of service. This problem is particularly acute where ambient temperatures to which the conductor bar is subjected vary appreciably, say from 20 degrees to 110 degrees Fahrenheit and the temperature of the system will experience a substantial temperature rise during operation, on the order of about 70 degrees Fahrenheit.

One of the principal objects of the present invention is the provision of a novel and improved rail type electric conductor comprising parts made of different types of material, one being of relatively high strength and good wearing characteristics serving as the part of the conductor bar engaged by a trolley or current collector and another being of relatively high conductivity serving as a primary current carrying part of the bar and wherein the parts of different material are shaped to provide a rigid, lightweight, bar in which the centers of gravity of the parts are closely adjacent each other to minimize deflection when the bar is subjected to temperature changes.

Another object of this invention is the provision of an electrical conductor bar of the type referred to in which the lightweight highly conductive part is formed of two separate pieces each connected to an opposite side of the high strength member and each having spaced transversely extending flanges.

A further object of this invention is to provide an electrical conductor bar of different metal members connected together, longitudinally coextensive, and having the characteristics referred to, in which the high strength part is T-shaped, having a flange portion and central web portion, which web is relatively thin at the juncture with the flange and relatively thick along the distal edge remote from the flange, the more conductive part has a web portion in contact with the central web portion of the T-shaped member and spaced transverse flange portions, one adjacent the flange portion of the T-shaped member and of greater mass than the other flange portion, which other flange portion can be secured to spaced supports, and the center of gravity of the parts are relatively close together so that there is relatively little transverse deflection of the composite bar in response to changes in temperature.

A further object of this invention is to provide an electrical conductor bar of the type referred to in which the T-shaped part is transversely adjustable relative to the more conductive part so that compensation can be made for wear in aligning longitudinally adjacent sections of the bar.

A still further object of this invention is the provision of an electrical conductor bar of the type referred to made of two parts in which the highly conductive part is an I-shaped member with a longitudinal aperture opening through one side and extending into the web portion between spaced longitudinal flanges, the wear-resistant high-strength part is a T-shaped member with the central web portion being narrower adjacent the transverse flange than at the distal end, and in which the web of the T-shaped member is tightly fitted within the aperture of the I-shaped member and frictionally retained without separate fastening means.

The invention resides in certain constructions and combinations and arrangement of parts, and other objects, features and advantages of the invention will be apparent from the following description of preferred embodiments thereof, reference being made to the accompanying drawings in which.

Figure 1:
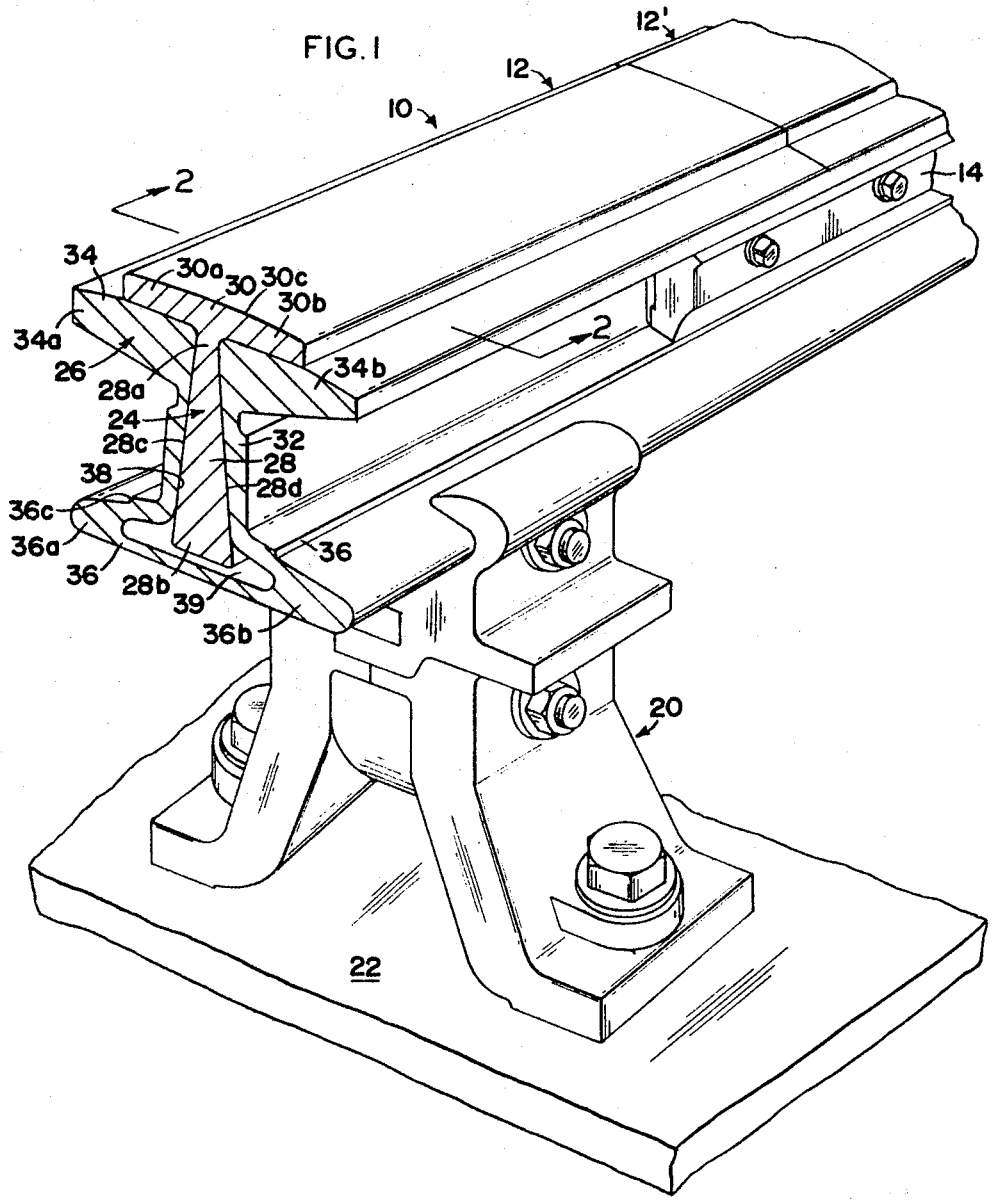
FIGURE 1 is a perspective view with parts in section of a portion of a trolley conductor bar embodying the invention, supported by a conductor bar support.

While various embodiments of a conductor bar constructed in accordance with the present invention are shown in the drawings and will be described subsequently in detail, the invention basically resides in a composite conductor bar formed of an elongated part T-shaped in cross section, of high strength and good wearing characteristics, and a highly conductive, light-weight, nonferrous metal electrical conductor part of one or more members extending in electrical contact along the T-shaped part and forming therewith a generally I-shaped conductor bar in which the centers of gravity of the high strength part and the high conductor part are close together so that deflection of the bar due to differential thermal expansion is kept small.

The nonferrous metal electrical conductor part of the bar can be of a single member, generally I-shaped in cross section, with an elongated slot that receives the web or stem of the T-shaped part, or it can be formed of two separate members with spaced longitudinally extending flanges, to be secured on opposite sides of the stem or web of the T-shaped part. The elongated parts forming the composite bar are fixed together at intervals or, in the case of the conductor bar in which the conductive part is a single piece with a central elongated slot, interengaging portions of the parts can be shaped to prevent transverse movement relative to each other and can be interengaged frictionally to prevent relative longitudinal movement so that other means for securing the parts together is not required. The T-shaped member of relatively hard, high strength, material having good wearing properties, such as steel, serves as the part of the trolley conductor bar engaged by the trolley or current collector and the nonferrous conductor part of the rail of a material light in weight and having high electrical conductivity, such as aluminum, serves as the primary current carrying part of the bar and as an anchoring member. Conductor bars of the constructions shown herein combine high strength and good wearing characteristics with high current carrying capacity and low weight so that the bar requires support only at widely spaced intervals, requires relatively few current feeding connections, and can extend in cantilevered fashion where necessary without substantial deflection at the end of the bar when subjected to typical temperature variations.

The reference to T-shaped and I-shaped parts is intended merely to describe the general shape of the parts, which may be varied within the scope of the invention.

Figure 2:
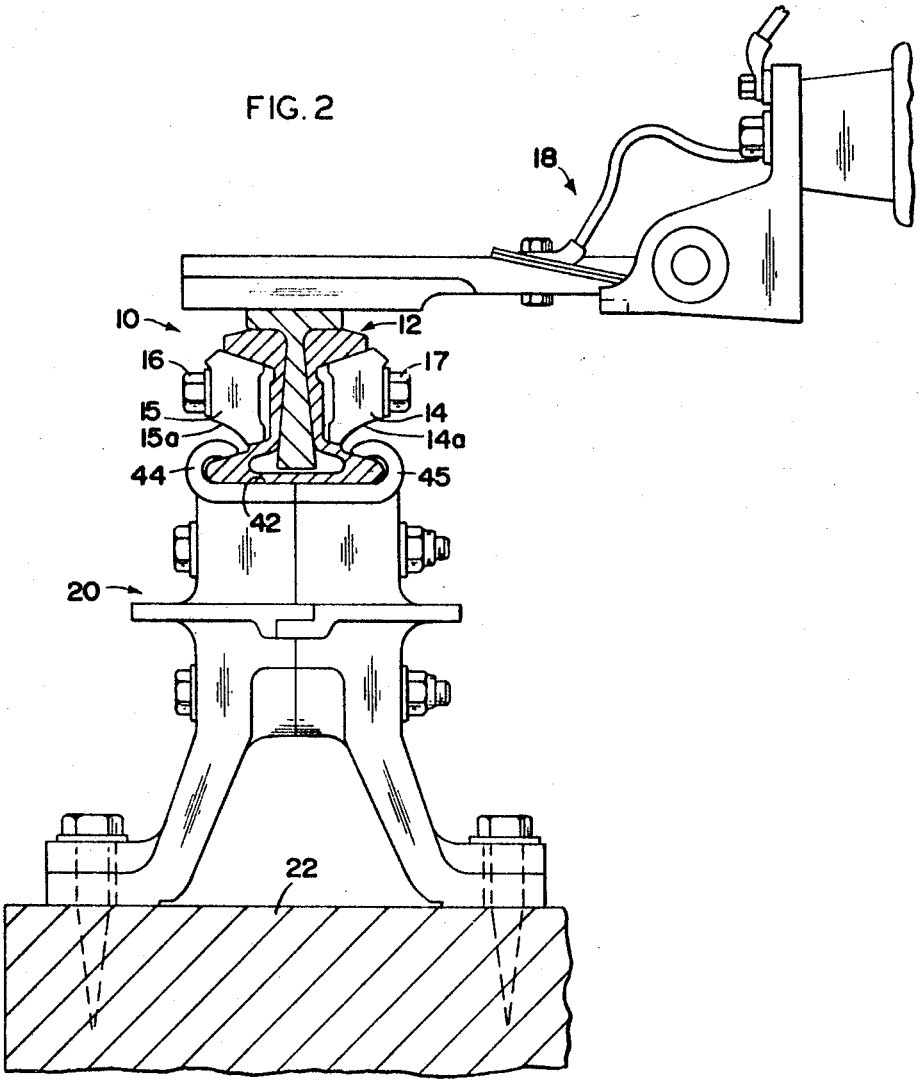
FIGURE 2 is a sectional view taken at a transverse plane approximately at the line 2—2 of FIGURE 1, diagrammatically showing a current collector engaging the upper surface of the conductor bar.

Referring now to the drawings, FIGURES 1 and 2 illustrate the general construction and arrangement of an electrified rail 10 comprising a number of conductor bars or rail sections, two of which are shown at 12, 12' in FIGURE 1, that embody the present invention. The conductor bars 12, 12' are mechanically and electrically connected end-to-end by means including splice plates 14, 15 on opposite sides of the bars and overlapping adjoining ends thereof. The plates 14, 15 are secured to the bars by bolts 16 and securing nuts 17. The electrified rail 10 is installed alongside a railway, not shown, to supply current to electrically powered vehicles on the railway through current collector-shoe assemblies 18 connected to the vehicles and spring-biased against the rail 10. The rail 10 is supported at suitable intervals along its length by support structures 20, one of which is shown in the drawings, and typically is shielded by a protective guard, not shown. The support structure 20 is shown secured to a cross tie 22.

The conductor bar 12 is a composite rail structure formed of an elongated part 24 made of steel having a cross sectional shape generally similar to that of a T-beam and an elongated part 26 made of aluminum, suitably secured together.

Figure 3:
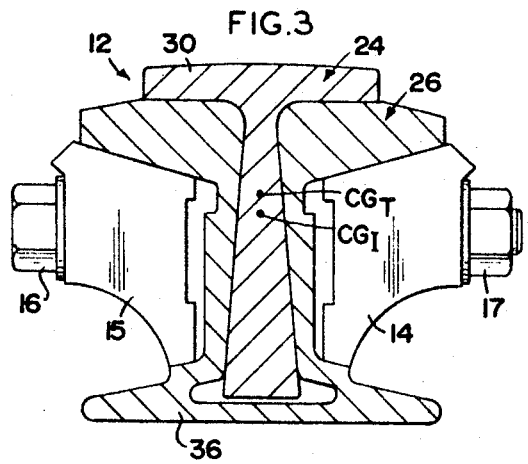
FIGURE 3 is a transverse sectional view of the conductor bar of FIGURE 2 on an enlarged scale.

The T-shaped part 24 includes a stem or central web 28 and a top flange 30 that has two oppositely extending portions 30a, 30b substantially perpendicular to the web 28, and a top surface 30c, which has a slight camber across the width of the top flange 30. The central web 28 includes a portion 28a relatively narrow in cross section that joins the flange 30, and a substantially wider portion 28b along the distal edge of the web remote from the flange 30. Side walls 28c, 28d of the web diverge from the flange 30 and the web therefore is tapered in cross section from the distal portion 28b toward the flange 30. The location of the center of gravity of the T-shaped part is materially influenced by the wide web portion 28b spaced from the flange. As a result, the center of gravity indicated at $CG_T$ in FIGURE 3 is located substantially further from the flange 30 than in a comparable member having a web of uniform thickness.

The I-shaped part 26, suitably an aluminum extrusion, includes a central web 32, a top flange 34 and a bottom flange 36. The top flange includes oppositely extending portions 34a, 34b generally perpendicular to the web 32 and the bottom flange 36 includes oppositely extending portions 36a, 36b generally perpendicular to the web 32. A medial longitudinally extending slot 38 is formed in the web 32 and opens through the top flange 34. The slot 38 is relatively narrow along the top flange 34 and diverges inwardly toward the bottom flange 36 in a tapered contour complementary to that of the stem or web 28 of the T-shaped part 24. The slot 38 is deeper than the web 28 and terminates in a transversely elongated recess that forms a longitudinally extending passageway 39 through the lower flange 36, reducing the weight of the lower flange.

The stem or web 28 of the T-shaped part is located within the slot 38 and is secured within the I-shaped part 26 by tight frictional engagement between the web and slot walls. This is achieved by maintaining close tolerances in the size of the web 28 and slot 38. In addition, the dovetail relationship of the parts prevents separation of the parts in a transverse direction. The two parts are assembled by forcing the web 28 longitudinally into the slot 38 under substantial force. Alternatively, the two parts can also be fixedly connected together, as by rivets, at intervals along the length of the bar 12.

With the two parts 24, 26 assembled, the top flange 34 of the I-shaped part 26 directly underlies and is in contact with the flange 30 of the T-shaped part 24. The flange 34 is of substantially greater width and thickness than the bottom flange 36. As a result, a substantial portion of the mass of the I-shaped part is spaced from the base or bottom flange and is located as close as possible to the flange 30 of the T-shaped part. This has an appreciable and significant affect upon the location of the center of gravity of the aluminum I-shaped part. As a result of this construction, the center of gravity of the part 26 is located at the point $CG_I$ in the transverse plane, as indicated in FIGURE 3, relatively close to the center of gravity $CG_T$ of the steel T-shaped part. It is of primary importance that this close relationship of the centers of gravity has been achieved without objectionably increasing the total weight of the conductor bar 12 otherwise dictated by considerations such as the basic shape, adequate strength, and high conductivity.

Each of the support structures 20 shown in FIGURES 1 and 2 and illustrative of suitable supports for the conductor bar 12 comprises a two member insulator assembly, the respective members of which are duplicates of one another and are preferably fabricated of Fiberglas or a suitable molded resin, such as epoxy, reinforced with Fiberglas or other suitable material.

The bottom flange 36 of the I-shaped conductor bar part 26 rests on a load bearing or supporting surface 42 of the two member insulator assembly 20. Each of the assemblies 20 has a pair of holddown or retaining flanges 44, 45 integral therewith, extending along opposite sides of the load supporting surface 42 and parallel to the conductor bar. The flanges 44, 45 curve upwardly and inwardly over the edge portion of opposite sides of the bottom flange of the conductor bar. The load surface 42 of each of the assemblies 20 and the hold-down flanges 44, 45 form spaced confronting abutments between which the edge portions of the bottom flange of the conductor bar are supportingly received. The hold-down flanges 44, 45 conform to but are slightly spaced from the conductor bar and prevent appreciable lateral or upward movements of the bar relative to the insulator support units or assemblies 20, but at the same time prevent longitudinal shifting of the conductor bar or rail relative to the support assemblies to accommodate elongation and contraction of the conductor bar which may occur by reason of temperature changes. The top sides of the bottom flange 36 of the conductor bar are preferably relieved slightly on each side, as at 36c, d to better accommodate the hold-down flanges 44, 45 of the support assemblies 20. The splice plates 14, 15 are also undercut or relieved as at 14a, 15a to better accommodate or receive the hold-down flanges 44, 45 where the support assemblies are located at the connection of two conductor bars 12, 12'. It will be apparent, of course, that the conductor bar can be supported in an overhead position and inverted with respect to the position shown, in which event, the insulator assemblies 20 would be suspended from suitable overhead support means and the current collector 18 would be spring biased upwardly so as to engage the then downwardly facing flange 30 of the wear resistant T-shaped rail part.

With reference to FIGURE 3 and other embodiments of the invention shown in FIGURES 4 to 7, particular cross sectional shapes and structural relationships are shown that take into consideration not only the need to minimize deflection of the bar, but also the need for providing adequate cooling surface, large cross sectional area of the conductor part for high conductivity suitable for carrying currents on the order of three thousand amperes, for providing low weight and high strength, a wide wear surface on which a current collector rides, and also a functional shape for suitably mounting the bar to support members and for coupling the bar ends together to form an electrified rail. It is within the framework of these requirements that the embodiments shown have provided relatively close centers of gravity of the parts of dissimilar metal to avoid substantial deflection of the composite conductor bar when subjected to thermal changes. By "substantial deflection" is meant a deflection of plus or minus ¼ inch or more at the free end of a conductor bar extending 10 feet beyond a fixed support, when the bar is subjected to a temperature variation from 21 degrees Fahrenheit to 182 degrees Fahrenheit. By relatively close centers of gravity is meant centers of gravity spaced apart no more than a distance equivalent to ¼ of the overall distance from the base flange of the I-shaped part to the transverse flange of the T-shaped part, and preferably the centers of gravity are spaced no more than 1/10 of such distance. The close relationship of the centers of gravity is achieved with only a small (e.g. 15 to 25%) acceptable increase in the conductor bar weight over the weight of composite bars constructed as disclosed in the aforementioned patent, so that the conductor bar retains a high strength to weight ratio.

By way of example, considering the conductor bar of FIGURE 3, the overall height of the bar is 3.8 inches, the cross sectional area of the aluminum I-shaped rail part 26 is 4.4 square inches, the cross sectional area of the steel T-shaped rail part 24 is 2.9 square inches, the combined weight of the conductor bar 12 is approximately 15 pounds per linear foot, and the center of gravity $CG_I$ of the I-shaped rail part 26 is located beneath the center of gravity $CG_T$ of the steel T-shaped rail part 24 (in the orientation of FIGURE 3) a distance of 0.3 inch.

Figure 4:
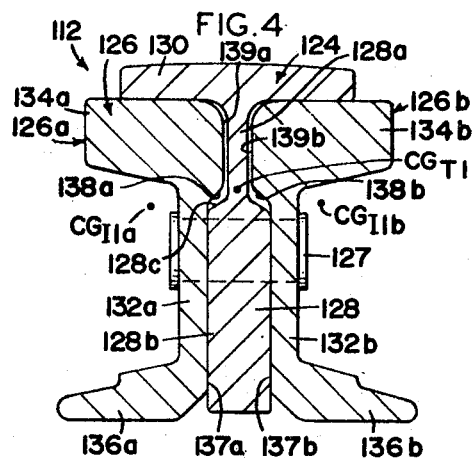
FIGURE 4 is a transverse sectional view of another embodiment of a conductor bar of the present invention constructed of three longitudinally extending members.

With reference now to FIGURE 4, a second embodiment of a conductor bar 112 is shown of three piece construction in which a T-shaped steel part 124 is secured for limited transverse adjustment between two aluminum bar members 126a, 126b, which together form an I-shaped conductor part 126. The three members are secured tightly together by spaced rivets 127, preferably aluminum, that pass transversely through the parts.

The T-shaped part 124 includes a stem or central web 128 and a top flange 130. The central web 128 includes a portion 128a relatively narrow in cross section that joins the flange 130, and a substantially wider portion 128b that forms the remainder of the web. Thus the narrow portion 128a and wider portion 128b are each of uniform thickness throughout so that opposite side surfaces of each portion are parallel. The two portions are joined by a shoulder portion 128c. The location of the center of gravity of the T-shaped part 124 is materially influenced by the wide web portion 128b. As a result, the center of gravity indicated at $CG_{T1}$ in FIGURE 4 is located farther from the flange 130 than in a T-shaped part having a web of uniform thickness.

The two conductor members 126a, 126b are mirror images of each other. The member 126a has a central web 132a, a top flange 134a and a bottom flange 136a. Both flanges 134a, 136a are generally perpendicular to the web 132a and provide adequate space therebetween to receive splice plates (not shown) and to facilitate clamping the conductor bar to a support assembly. The top flange is of substantially greater thickness than the bottom flange. A flat surface 137a is provided on the member 126a, facing the opposite direction from the two flanges 134a, 136a. This surface extends from adjacent the bottom of the member 126a upward to a shoulder 138a. A flat surface 139a extends from the shoulder toward the opposite end of the member 126a and terminates in a radiused portion at the top of the flange 134a. As will be seen from FIGURE 4, the distance from the shoulder 138a to the upper end of the flange 134a is somewhat shorter than the length of the narrower portion 128a of the T-shaped part. This provides a gap between the shoulder 138a and the shoulder portion 128c of the T-shaped part when the flange 130 of the T-shaped part is against the flanges 134a, 134b. The gap permits limited transverse adjustment of the T-shaped part 124 relative to the two conductor members 126a, 126b. This allows the upper surface of the flange 30 to be adjusted into close alignment with the corresponding surface of an adjacent conductor bar so as to accommodate differences in flange thickness as would exist between old sections of an electrified rail and new unworn sections.

The parts of the members 126b correspond to similar parts of the member 126a, are designated by the same reference numerals with the suffix b, and will not be described in detail.

With the parts 124, 126 assembled, the top flanges 134a, 134b directly underlie and are in contact with the flange 130 of the T-shaped part, unless the T-shaped part is raised after considerable use to accommodate for wear of the flange 130. This would be accomplished by drilling out the rivets 127, redrilling the bar parts in new locations after adjustment, and riveting the parts back together. As a result of the substantially greater thickness of the top flanges 134a, 134b as compared to the bottom flanges 136a, 136b, a substantial portion of the mass of the two members 126a, 126b is spaced from the base or bottom flanges and is located as close as possible to the flange 130 of the T-shaped part. This has an appreciable significant affect upon the location of the centers of gravity of the two aluminum members, which, as a result of this construction, are located within a transverse plane at the two points $CG_{IIa}$ and $CG_{IIb}$, indicated in FIGURE 4. Both of these points are in space rather than within the confines of the members 126a, 126b. Both, however, are equally spaced in opposite transverse directions from the center of gravity $CG_{T1}$ and a transverse line connecting the centers of gravity of the two aluminum members extends extremely close and slightly below the center of gravity $CG_{T1}$ of the T-shaped part. As in the previous embodiment, this close relationship of the centers of gravity is achieved with only a small increase in the total weight of the conductor bar.

The three-piece construction has the added advantage over a two-piece construction of eliminating the need for a complete lower flange on the conductor means. This further reduces the weight of the highly conductive parts especially at a location greatly spaced from the center of gravity of the T-shaped part where reduction in mass is most effective in contributing to the relatively high location of the centers of gravity $CG_{IIa, b}$.

Figure 5:
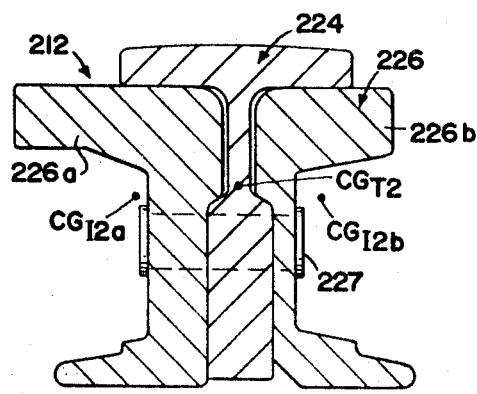
FIGURE 5 is a transverse sectional view of another embodiment of a conductor bar of the present invention constructed of three longitudinally extending members.
Figure 6:
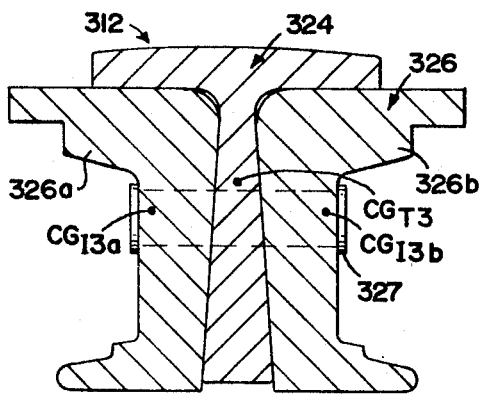
FIGURE 6 is a transverse sectional view of another embodiment of the present invention constructed to provide low electrical resistance.
Figure 7:
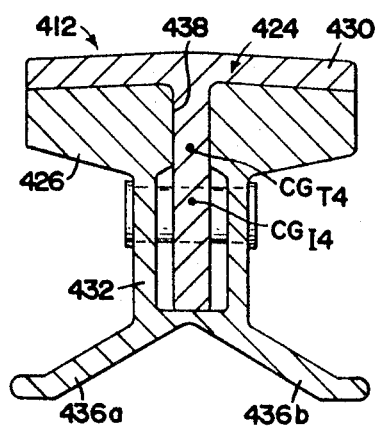
FIGURE 7 is a transverse sectional view of a further embodiment of a conductor bar of the present invention in which the two members forming the conductor bar are held together without fastening means.

Modifications of the above described basic embodiments of this invention are shown in FIGURES 5, 6 and 7 of the drawings. Because the basic construction will be understood from the detailed description of the first two embodiments, only the distinguishing features of the remaining embodiments will be specifically described.

In FIGURE 5 a conductor bar 212 is shown, similar to the conductor bar 112 of FIGURE 4 in that it is of three-piece construction with a steel T-shaped part 224 and a highly conductive part 226 formed of two aluminum conductor members 226a, 226b, one on each side of the T-shaped part. In the construction shown, no provision has been made for relative transverse adjustment between the T-shaped part 224 and the conductor members 226a, 226b, although such adjustment could be provided as in the embodiment of FIGURE 4. The conductor member 226a is of substantially greater cross sectional area than the member 226b on the opposite side by virtue of a thicker web portion and wider top flange to provide a conductor bar of lower electrical resistance. The tow parts 226 and 224 are secured together by rivets 227. The centers of gravity $CG_{T2}$, $CG_{I2a}$ and $CM_{I2b}$ are located in positions substantially identical to the positions of the centers of gravity of the embodiment of FIGURE 4, the wider top flange of member 226a compensating for the thicker web portion.

A further embodiment of a three-piece conductor bar is shown at 312 in FIGURE 6 of the drawings. This is a low resistance conductor bar having a T-shaped steel part 324 similar in shape to the T-shaped part 24 of FIGURE 3, an alumium conductor part 326 including members 326a and 326b on each side of the T-shaped part, and a rivet 327 connecting the parts together in fixed relationship. The aluminum members are of greater mass than in the other embodiment shown and offer less resistance to electrical current. The center of gravity of the steel T-shaped part 324 is indicated at $CG_{T3}$ and the centers of gravity $CG_{I3a}$ and $CG_{I3b}$ of the two conductor members lie along a transverse line that passes beneath and closely adjacent to the center of gravity $CG_{T3}$.

A two-piece conductor bar 412 is shown in FIGURE 7 of the drawings. The bar includes a T-shaped steel part 424 of similar construction to the bar 124 of FIGURE 4, but with a wider top flange 430 and a shorter central web 428. The shorter central web substantially reduces the weight of the T-shaped part and thus the weight of the overall conductor bar. The bar includes a single, generally I-shaped, conductor part 426 with a medial longitudinally extending slot 438 shaped complementary to the web of the T-shaped part 424 and which provides no clearance for transverse adjustment of the T-shaped part. Relatively thin lower flange portions 436a, 436b extend outwardly and downwardly from a central web portion 432. The composite structure forms what is known as an "elevator T." Thus, while the overall height of the bar 12 is essentially the same as in the other embodiments, the weight is substantially less. The T-shaped part 424 tightly fits within the slot 438 so that rivets or other connecting means between the two parts are not required. The center of gravity of the T-shaped part 424 is indicated at $CG_{T4}$ and the center of gravity of the I-shaped part 426 is indicated at $CG_{I4}$ directly below and closely adjacent the center of gravity of the T-shaped part. Because of the wide flange and short web of the T-shaped part, the center of gravity $CG_{T4}$ is slightly higher than the centers of gravity in T-shaped parts 124 and 224 resulting in a slightly greater distance between the centers of gravity of the aluminum conductor part 426 and the T-shaped part 424.

From the foregoing description of preferred embodiments of the invention it will be apparent that new and improved conductor bars have been provided that minimize deflection from thermal expansion while yet providing the other necessary features of high strength, good wearing characteistics, high conductivity and light weight.

While prferred embodiments of the invention have been described in considerable detail it is to be understood that the invention is not limited to the particular constructions shown and it is the intention to cover hereby all modifications and adaptations thereof which come within the practice of those skilled in the art to which the invention relates.

What is claimed is:

1. An electrical conductor bar for an electrical power distributing system wherein the conductor bar is slidably engaged by an electric current collector, said conductor bar comprising an elongated ferrous metal part T-shaped in transverse cross section with a transversely extending longitudinal flange and an adjoining central longitudinal web that is relatively thin at the juncture with the flange and relatively thick along the distal edge remote from the flange, and a highly conductive nonferrous metal electrical conductor part extending along the T-shaped part, having web portions along opposite sides of the longitudinal web of the T-shaped member in electrical contact therewith and first and second longitudinal flange portions extending transversely from the web portions on opposite sides of the said longitudinal web of the T-shaped part, the said first flange portions closely engaging the said longitudinal flange of the T-shaped part, having a relatively large transverse cross sectional area compared with the said second flange portions and being located adjacent a relatively thin portion of the said longitudinal web, the said second flange portion being located adjacent the relatively thick portion of the said longitudinal web.

2. An electrical conductor bar as set forth in claim 1 wherein the highly conductive nonferrous metal electrical conductor part comprises two separate members secured to the T-shaped part on opposite sides of the said central longitudinal web at locations spaced along the said web.

3. In an electric conductor bar for an electric power distribution system wherein the conductor bar is slidably engaged by an electric current collector, said conductor bar comprising an elongated T-shaped ferrous metal part having a central web and a transversely extending longitudinal flange, and an elongated nonferrous metal part of high conductivity having a web portion in contact with the central web of the T-shaped part and having first and second spaced transversely extending longitudinal flanges along opposite edges of said web portion, the said first flange being located adjacent to the longitudinal flange of the T-shaped part, the improvement which comprises thick and thin portions of the central web of the T-shaped part, the thin portions being adjacent the transverse flange thereof and the thick portions being remote therefrom, and a thick first flange on said nonferrous metal part adjacent the longitudinal flange of the T-shaped part and a thin second flange, whereby the centers of gravity of the parts are located relatively close together to avoid substantial distortion of the bar from temperature changes and yet the bar is strong, light, and highly electrically conductive.

4. An electrical conductor bar for an electric power distributing system wherein the conductor bar is slidably engaged by an electric current collector, said conductor bar comprising an elongated ferrous metal part T-shaped in transverse cross section with a transversely extending longitudinal flange and an adjoining central longitudinal web that is relatively thin at the juncture with the flange and relatively thick along the distal edge remote from the flange, and an elongated nonferrous metal part of high electrical conductivity having a central web and first and second flange portions respectively along each of first and second opposite elongated edges of the web thereof, forming therewith outwardly facing channels open along opposite sides of said nonferrous metal part to receive support members and/or splice plates, an elongated central aperture in the nonferrous metal part coextensive with the length thereof in the said first elongated edge and extending toward said second elongated edge, said aperture being narrower adjacent said first elongated edge than adjacent said second elongated edge to substantially conform in shape with the central longitudinal web of said T-shaped part sufficiently to receive the said central longitudinal web and closely engage surface portions of the web on opposite sides thereof.

5. An electrical conductor bar for an electric power distributing system wherein the conductor bar is slidably engaged by an electric current collector, said conductor bar comprising an elongated ferrous metal part T-shaped in transverse cross section with a transversely extending longitudinal flange and an adjoining central longitudinal web that is relatively thin at the juncture with the flange and relatively thick along the distal edge remote from the flange, and an elongated nonferrous metal part of high electrical conductivity having a central web and first and second flange portions respectively along each of first and second opposite elongated edges of the web thereof, forming therewith outwardly facing channels open along opposite sides of said nonferrous metal part to receive support members and/or splice plates, said first flange portions closely engaging the flange of the T-shaped part and having a relatively large transverse cross sectional area compared with said second flange portions, an elongated central aperture in the nonferrous metal part coextensive with the length thereof in the said first elongated edge and extending toward said second elongated edge, said aperture being narrower adjacent said first elongated edge than adjacent said second elongated edge to substantially conform in shape with the central longitudinal web of said T-shaped part sufficiently to receive the said central longitudinal web and closely engage surface portions of the web on opposite sides thereof.

6. An electrical conductor bar for an electric power distributing system wherein the conductor bar is slidably engaged by an electric current collector, said conductor bar comprising an elongated ferrous metal part T-shaped in transverse cross section with a transversely extending longitudinal flange and an adjoining central longitudinal flange and an adjoining central logitudial web that is relatively thin at the juncture with the flange and relatively thick along the distal edge remote from the flange, and elongated nonferrous metal part of high electrical conductivity having a central web and first and second flange portions respectively along each of first and second opposite elongated edges of the web thereof, forming therewith outwardly facing channels open along opposite sides of said nonferrous metal part to receive support members and/or splice plates, said first flange portions closely engaging the flange of the T-shaped part and having a relatively large transverse cross sectional area compared with said second flange portions, an elongated central aperture in the nonferrous metal part coextensive with the length thereof in the said first elongated edge and extending toward said second elongated edge, said aperture being narrower adjacent said first elongated edge than adjacent said second elongated edge to substantially conform in shape with the central longitudinal web of said T-shaped part sufficiently to receive the said central longitudinal web and closely engage surface portions of the web on opposite sides thereof, and terminating adjacent said second elongated edge in an elongated recess substantially larger than the terminal portion of the web of the T-shaped part received therein so as to provide an elongated passageway within the conductor bar.

7. An electrical conductor bar for an electric power distributing system wherein the conductor bar is slidably engaged by an electric current collector, said conductor bar comprising an elongated ferrous metal part T-shaped in transverse cross section with a transversely extending longitudinal flange and an adjoining central longitudinal web that is relatively thin at the juncture with the flange and relatively thick along the distal edge remote from the flange, and an elongated nonferrous metal part of high electrical conductivity having a central web with first and second opposite elongated edges, an elongated central aperture in the nonferrous metal part coextensive with the length thereof in said first elongated edge and extending toward said second elongated edge, said aperture being narrower adjacent the said first elongated edge than adjacent the said second elongated edge to substantially conform in shape with the central longitudinal web of said T-shaped part sufficiently to receive the said central longitudinal web and closely engage surface portions of the web on opposite sides thereof, and a transversely extending flange portion along said second elongated edge of the web of the nonferrous part for securing the bar to a support.

8. An electrical conductor bar for an electrical power distributing system wherein the conductor bar is slidably engaged by an electric current collector, said conductor bar comprising: an elongated ferrous metal part T-shaped in transverse cross section with a transversely extending longitudinal flange and an adjoining central longitudinal web that is essentially perpendicular to the flange, and that has a relatively thin portion with flat parallel sides at the juncture with the flange and a relatively thick portion with flat parallel sides adjacent the distal edge remote from the flange; and highly conductive nonferrous metal electrical conductor means extending along the T-shaped part, having web portions along opposite sides of the longitudinal web of the T-shaped member with flat parallel surfaces in contact with flat surface portions of the said longitudinal web, the web portions of the conductor means in contact with the relatively thin portion of the web of the T-shaped part being shorter than the said thin portion to permit relative transverse adjustment between the T-shaped part and the conductor means, and first and second longitudinal flange portions extending transversely from the web portions of the conductor means on opposite sides of the said longitudinal web of the T-shaped part, the said first flange portions having a relatively large transverse cross sectional area compared with the said second flange portions and being located adjacent the relatively thin portion of the said longitudinal web of the T-shaped part, the said second flange portions being located adjacent the relatively thick portion of the said longitudinal web.

References Cited

UNITED STATES PATENTS

| | | | |
|---|---|---|---|
| 2,820,084 | 1/1958 | Shaw | 191—22 |
| Re. 26,189 | 4/1967 | Dehn | 191—22 |

FOREIGN PATENTS

| | | |
|---|---|---|
| 71,725 | 11/1915 | Austria. |
| 959,831 | 3/1957 | Germany. |

ARTHUR L. LA POINT, Primary Examiner

D. F. WORTH III, Assistant Examiner

U.S. Cl. X.R.

191—23